US 7,003,366 B1

(12) United States Patent
Chiou

(10) Patent No.: US 7,003,366 B1
(45) Date of Patent: Feb. 21, 2006

(54) DIAGNOSTIC SYSTEM AND OPERATING METHOD FOR THE SAME

(75) Inventor: Hung-Wen Chiou, Hsinchu (TW)

(73) Assignee: ProMOS Technologies Inc., Hsinchu (TW)

( * ) Notice: Subject to any disclaimer, the term of this patent is extended or adjusted under 35 U.S.C. 154(b) by 0 days.

(21) Appl. No.: 11/109,225

(22) Filed: Apr. 18, 2005

(51) Int. Cl.
G06F 15/18 (2006.01)
G06F 19/00 (2006.01)

(52) U.S. Cl. .......................... 700/108; 700/26; 700/50; 700/80; 700/121; 706/8; 706/9

(58) Field of Classification Search ................ 700/26, 700/30, 31, 50, 80, 108, 109, 110, 121; 706/5, 706/7, 8, 9, 23, 46, 47; 438/14; 714/37, 714/38, 46, 47
See application file for complete search history.

(56) References Cited

U.S. PATENT DOCUMENTS

| | | | | |
|---|---|---|---|---|
| 6,110,214 A | * | 8/2000 | Klimasauskas | ............ 700/30 |
| 6,557,118 B1 | | 4/2003 | Schleiss et al. | ............ 714/37 |
| 6,597,447 B1 | | 7/2003 | Stirton et al. | ............ 356/237.2 |
| 6,633,782 B1 | | 10/2003 | Schleiss et al. | ............ 700/26 |
| 2005/0209981 A1 | * | 9/2005 | Chen | ............ 706/8 |

OTHER PUBLICATIONS

"Multi-Variable Process Window Based Fuzzy Fault Detection System" By author Hung-Wen Chiou and Tings Wang from Asia AEC/APC Dec. 8, 2004 conference.

* cited by examiner

Primary Examiner—Jayprakash N. Gandhi
Assistant Examiner—Charles Kasenge
(74) Attorney, Agent, or Firm—J.C. Patents

(57) ABSTRACT

An operating method for a fault detection of a semiconductor process and a diagnostic system for fault detection in a semiconductor process are described. By using the method and the diagnostic system, the real-time process parameters collected during the process is performed by the tool become meaningful and are correlated with the historic process performance data obtained by the post process metrology process. Moreover, the method and the diagnostic system further provide an alarm index for the process performed on the tool to actually reflect the process environment during the process is performed after correlating the real-time process parameters and the historic process performance data. With referring to the alarm index, the current process performance under the real-time process parameters in the tool can be accurately diagnosed.

18 Claims, 5 Drawing Sheets

| prouss | process performane data | process parameter |
|---|---|---|
| prouss $z_1$ | Thickness: $y_1$<br>Depth: $y_2$<br>Critical Dimension: $y_3$ | Power $x_1$, Gas Ratio $x_2$, Pressure $x_3$ ........<br>Power $x_4$, Gas Ratio $x_5$, Pressure $x_6$ ........<br>Power $x_7$, Gas Ratio $x_8$, Pressure $x_9$ ........<br>⋮ |
| | Thickness: $y_4$<br>Depth: $y_5$<br>Critical Dimension: $y_6$ | Power $x_{10}$, Gas Ratio $x_{11}$, Pressure $x_{12}$ ......<br>Power $x_{13}$, Gas Ratio $x_{14}$, Pressure $x_{15}$ ......<br>Power $x_{16}$, Gas Ratio $x_{17}$, Pressure $x_{18}$ ......<br>Power $x_{19}$, Gas Ratio $x_{20}$, Pressure $x_{21}$ ......<br>⋮ |
| | ⋮ | ⋮ |
| prouss $z_2$ | Film Quality: $y_4$<br>Defects: $y_6$ | Pressure $x_{22}$ Process Time $x_{23}$ ..........<br>Pressure $x_{24}$ Process Time $x_{25}$ ..........<br>Pressure $x_{26}$ Process Time $x_{27}$ ..........<br>⋮ |
| | | Pressure $x_{28}$ Process Time $x_{29}$ ..........<br>Pressure $x_{30}$ Process Time $x_{31}$ ..........<br>Pressure $x_{32}$ Process Time $x_{33}$ ..........<br>⋮ |
| | ⋮ | ⋮ |

FIG. 2       102a

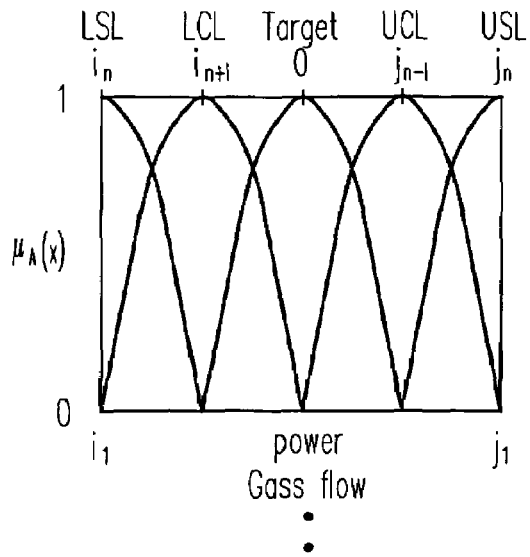
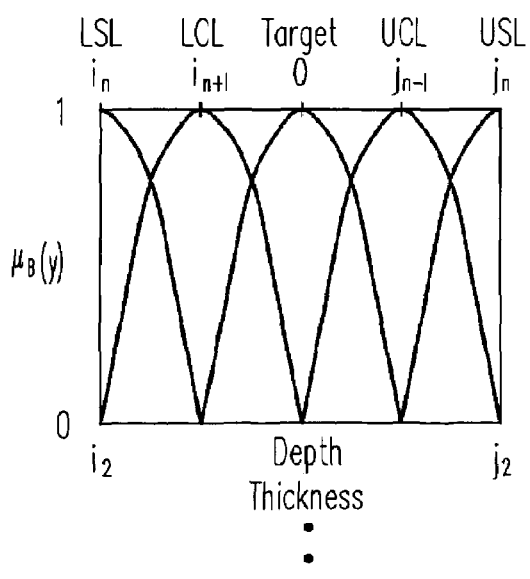
FIG. 4

DIAGNOSTIC SYSTEM AND OPERATING METHOD FOR THE SAME

BACKGROUND OF THE INVENTION

1. Field of Invention

The present invention relates to a diagnostic system and a method for operating the diagnostic system. More particularly, the present invention relates to a diagnostic system for fault detection in a semiconductor process and an operating method thereof.

2. Description of Related Art

Currently, in the semiconductor process, a metrology process for checking the process performance is performed every several runs. The metrology process includes several measurement items, such as thickness, depth, uniformity, critical dimension, defect count, film quality, etc. When the result of the metrology process shows that the process performance is abnormal, the users will check or re-tune the tool that is used to perform the process and modify the process recipe in order to adjust the process performance to be normal.

However, the metrology process is not performed for every process run of each wafer since it takes long time to perform the metrology process. Hence, the result of the metrology process does not real-time reflect the timing at which the process performance starts to change due to the variation of the process environment. Conventionally, the fault detection for diagnosing the variation of the process parameters of the tool during the process is performed is set by referring to the historic process parameters of the tool without relating to the post process measurement result of the metrology process. Nevertheless, different combination of the variations of the process parameters will lead to different process performance. Some combination of the variation of the process parameters may not affect the process performance and some may impact the process performance. Therefore, it is possible that the fault diagnostic happens since the fault detection is only based on the current variation of the process parameters and the historical process parameters.

SUMMARY OF THE INVENTION

Accordingly, at least one objective of the present invention is to provide a diagnostic system for a fault detection in a semiconductor process. By using the diagnostic system during the implementation of the semiconductor process, the process parameters impacting the process performance can be quantified to be an alarm index indicating whether there is process fault during the semiconductor process is performed.

At least another objective of the present invention is to provide a diagnostic method for a process performed by a tool. By using the method of the present invention, the process can be real-time monitored and the fault can be on-line detected during the process is performed. Further, the process result can be predicted and the process fault can be diagnosed based on the process parameters obtained during the process is performed by the tool.

To achieve these and other advantages and in accordance with the purpose of the invention, as embodied and broadly described herein, the invention provides a diagnostic system comprising means for receiving a set of variables including a tool information of a first tool, a process information with respect to a first process performed by the first tool and at least a set of real-time process parameters of the first tool obtained during the first process is performed by the first tool. The diagnostic system also includes means for storing a knowledge database comprising a plurality of sets of historic process performance data, a plurality of sets of historic process parameters, a plurality of sets of process parameter membership functions and a plurality of sets of process performance membership functions. Further, the diagnostic system comprises means for retrieving a portion set of the historic process parameters with reference to the received tool information and the received process information from the knowledge database. Moreover, the diagnostic system further includes means for approximately matching the received set of real-time process parameters with the retrieved sets of the historic process parameters to trace a candidate set of the historic process performance data corresponding to the matched set of the historic process parameters. Still, the diagnostic system comprises means for fuzzifying each of the received real-time process parameters by using the corresponding sets of the process parameter membership functions to correspondingly generate a process parameter fuzzy value, means for applying a set of fuzzy rules on the set of the process parameter fuzzy values with the candidate set of the historic process performance data and the corresponding sets of the process performance membership functions to generate a plurality of sets of metrology fuzzy sets, means for defuzzifying the sets of metrology fuzzy sets to generate an alarm index, means for determining whether the alarm index falls into a process specification of the first process and means for triggering an alarm when the alarm index does not fall into the process specification.

The present invention also provides a diagnostic method for a first process performed by a first tool with at least a set of real-time process parameters of the first tool obtained during the first process is performed on a first wafer by the first tool. The diagnostic method comprises steps of providing a set of variables including a tool information of the first tool, a process information with respect to the first process and the set of real-time process parameters to a diagnostic system having a knowledge database, wherein the knowledge database comprises a plurality of sets of historic process performance data, a plurality of sets of historic process parameters, a plurality of sets of process parameter membership functions and a plurality of sets of process performance membership functions. Then, a portion of the historic process parameter sets is retrieved with reference to the received tool information and the received process information from the knowledge database. Moreover, the received set of real-time process parameters are approximately matched with the retrieved sets of the historic process parameters to trace a candidate set of the historic process performance data corresponding to the matched set of the historic process parameters. Each of the received real-time process parameters is fuzzified by using the corresponding sets of the process parameter membership functions to correspondingly generate a process parameter fuzzy value and a set of fuzzy rules is applied to the set of the process parameter fuzzy values with the candidate set of the historic process performance data and the corresponding sets of the process performance membership functions to generate a plurality of sets of metrology fuzzy sets. Further, the sets of metrology fuzzy sets are defuzzified to generate an alarm index and a decision for determining whether the alarm index falls into a process specification of the first process is made. Finally, when the alarm index does not fall into the process specification of the first process, an alarm is triggered.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is a schematic diagram showing data pages for storing the historic process performance data and the historic process parameters.

FIG. 4 is a schematic diagram showing a data list for storing membership functions.

DESCRIPTION OF THE PREFERRED EMBODIMENTS

In the invention, a novel operating method for a fault detection of a semiconductor process and a diagnostic system for a fault detection in a semiconductor process are proposed. By using the method and the diagnostic system, the real-time process parameters, which are collected during the process is performed by the tool, become meaningful and are correlated with the historic process performance data obtained by the post process metrology process. Moreover, the method and the diagnostic system further provide an alarm index for the process performed on the tool to actually reflect the process environment during the process is performed after correlating the real-time process parameters and the historic process performance data. With referring to the alarm index, the current process performance under the real-time process parameters in the tool can be accurately predicted.

Figure 1:
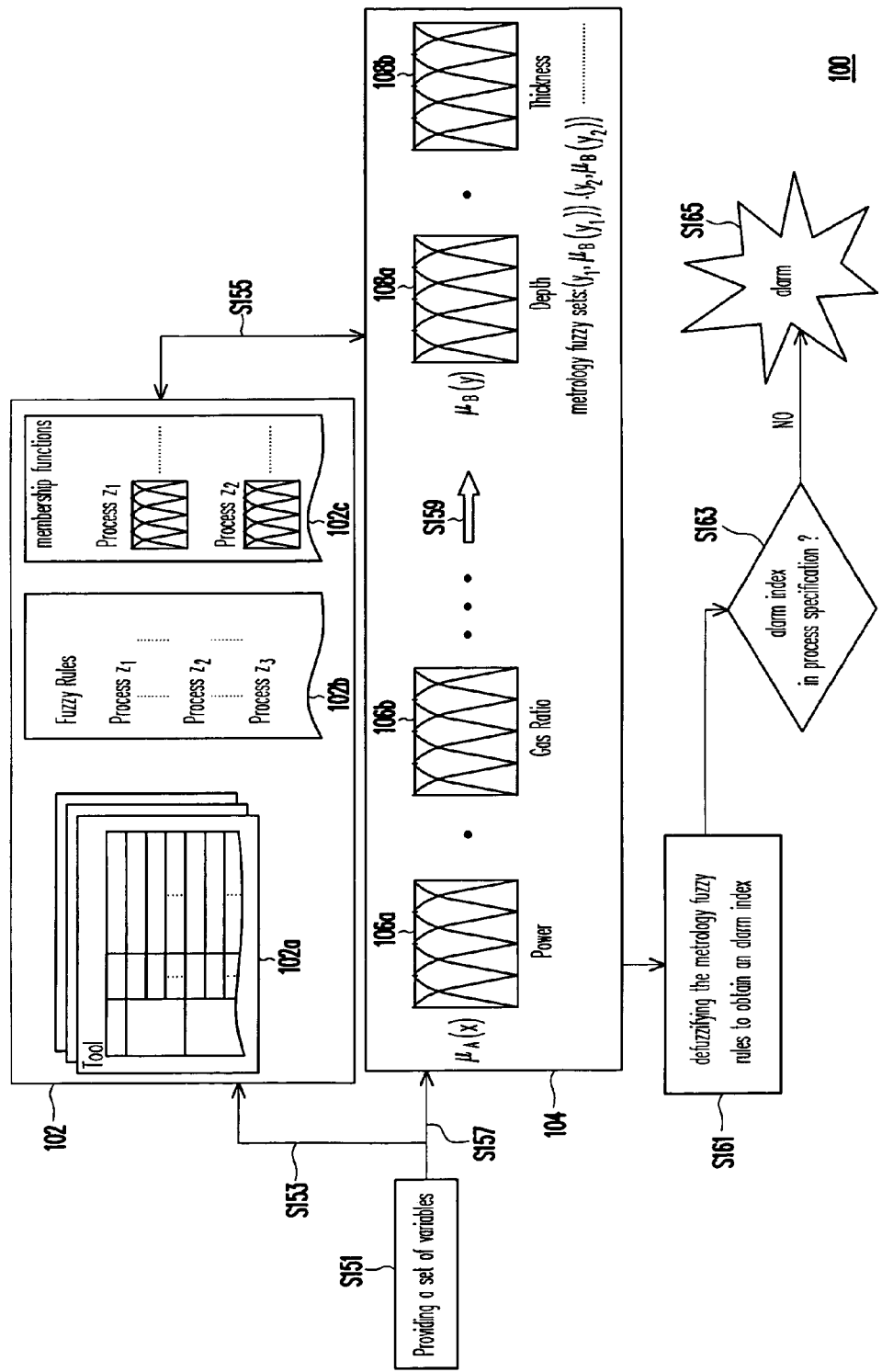
FIG. 1 is a flow chart illustrating the diagnostic method according to one preferred embodiment of the present invention.

FIG. 1 is a flow chart illustrating the diagnostic method according to one of the preferred embodiments of the present invention. As shown in FIG. 1, in order to diagnose a first process performed by a first tool, in the step S151, a receiving means (not shown) of a diagnostic system 100 receives a set of variables including tool information of the first tool, process information with respect to the first process and at least one set of real-time process parameters (e.g. $x_1$, $x_2$, $x_3$, $x_4$ etc.). The set of the real-time process parameters include several categories comprising the gas flow, the pressure, the power, the process time, temperature, exposure dosage etc. The real-time process parameters can be real-time detected by tool sensors (not shown) of the first tool during the first process performed by the first tool, and the number and the type of the process parameters which the tool sensors detect vary depending on what kind of the first process is performed by the first tool. More specifically, the tool sensors real-time detect process parameters at every defined sampling rate, for example, in every second. The diagnostic system 100 can be, for example but not limited to, a computer program code stored in a memory storage medium.

In addition, the diagnostic system possesses a knowledge database 102. The knowledge database 102 comprises a plurality of sets of historic process performance data, a plurality of sets of historic process parameters, a plurality of fuzzy rules, a plurality of sets of process parameter membership functions and a plurality of sets of process performance membership functions. The sets of the historic process parameters are the historic records obtained from the tool sensors during the processes are performed by the tools respectively, and each set of the historic process performance data is also the historic records received from each post process metrology process.

FIG. 2 is a schematic diagram showing data pages for storing the historic process performance data and the historic process parameters. As shown in FIG. 2, in the knowledge database 102, the historic process parameter sets and the historic process performance data sets are stored and classified according to the corresponding processes and the tools. For example, the historic process parameter sets and the historic process performance data sets are stored and categorized into several data pages 102a according to the tools where the process is performed. Moreover, the sets of historic process parameters and the sets of historic process performance data in each data page are also classified into several classes with respect to each process. Also, the sets of the historic process parameters in each class are further sorted into several groups with respect to each process implementation. Meanwhile, the sets of the historic process performance data in each class is sorted into the groups with respect to each process implementation. Depending on different nature of the process, the categories of the historic process performance data sets are manifold. The categories of the historic process performance data (e.g. $y_1$, $y_2$, $y_3$, $y_4$ etc.) sets includes thickness, depth, critical dimension, film quality, defect counts, overlay offset parameters, etc. It should be noticed that since the post process metrology process is not performed for every process implementation, not every group contains the historic process performance data set.

Figure 3:
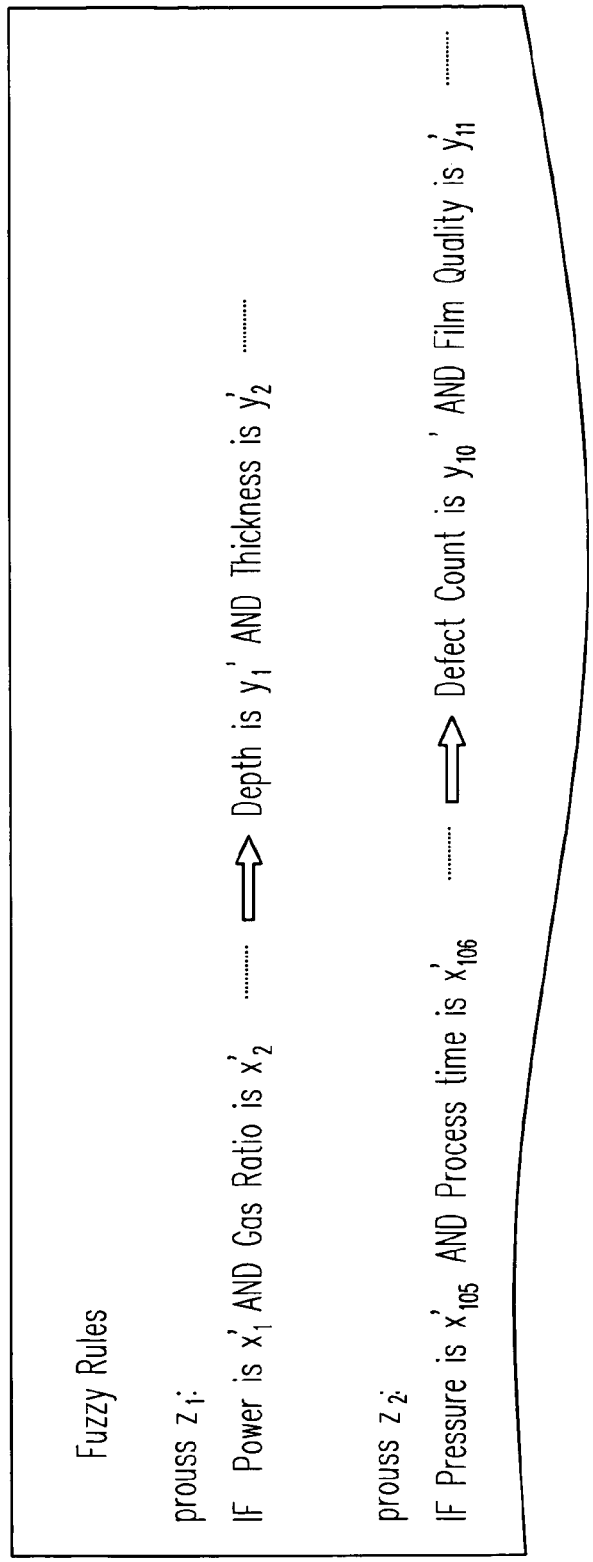
FIG. 3 is a schematic diagram showing a data list for storing fuzzy rules.

FIG. 3 is a schematic diagram showing a data list for storing fuzzy rules. As shown in FIG. 3, the fuzzy rules in the knowledge database 102 are stored in a fuzzy rule bank 102b. For example, the fuzzy rules in the fuzzy rule bank 102b are categorized according to the process. More specifically, the fuzzy rules for each process describe a relation between the input/given process parameters of a process performed on a tool and the result process performance data of the process. Still in FIG. 3, taking the process $z_1$ as an example, a combination of the process parameters, Power is $x_1'$, Gas Ratio is $x_2'$ etc., implicates a combination of the process performance data, Depth is $y_1'$, Thickness is $y_2$ etc. In the present invention, the fuzzy rules are represented by IF/THEN rules with AND logic operations (intersection operation). However, the present invention is not limited to this kind of representation. Further, depending on the relationship between the input/given process parameters of a process performed on a tool and the result process performance data of the process, the fuzzy rules can be any kind of fuzzy implication statements or fuzzy conditional statements with any kind of logic operations, such as union operation, intersection operation, complement operation, etc.

Figure 5:
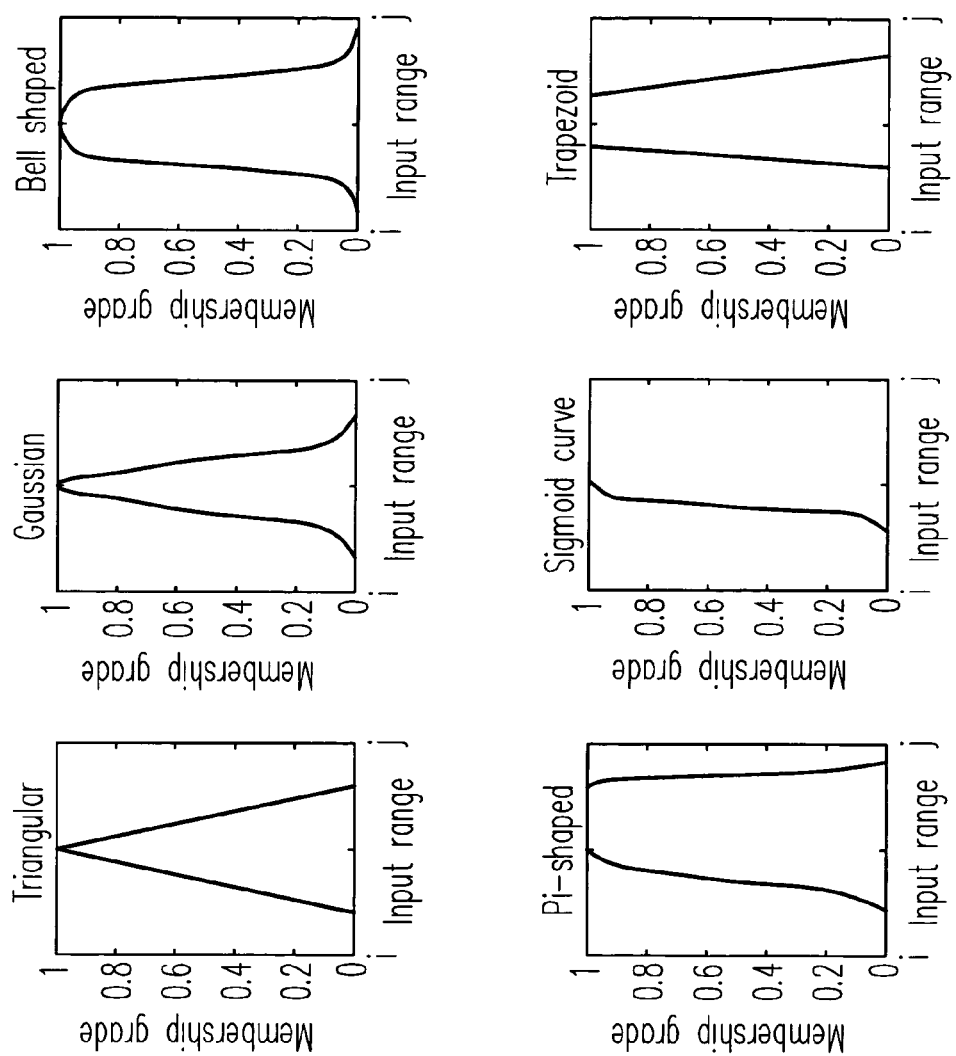
FIG. 5 illustrates schematic diagrams showing the membership function shapes used for fuzzification.

FIG. 4 is a schematic diagram showing a data list for storing membership functions. As shown in FIG. 4, the membership functions including the sets of process parameter membership functions and the sets of process performance membership functions are stored in a membership function data bank 102c. In the fuzzy logic theorem, a membership function is a function that maps the elements x of the input/output universal set $U_x$, such as the real-time process parameter sets into fuzzy values $\mu_A(x)$ ranging from 0 to 1. Typically, the membership function possesses several shapes. As shown in FIG. 5, the types of membership function shape include Triangular, Gaussian, Bell shaped, Pi-shaped, Sigmoid curve and Trapezoid. In this preferred embodiment, the shape of the membership function is represented by Gaussian. However, the present invention is not limited by using the Gaussian shape membership function.

Furthermore, as shown in FIG. 4, the input range from $i_1$ to $j_1$ of each category, such as Power, Gas flow, Pressure etc., of the given universal set/given process parameter set of the present invention is further quantized into five subsets in following order: lower spec limit (LSL) subset, lower control limit (LCL) subset, Target subset, upper control limit (UCL) subset and upper spec limit (USL) subset. It should be noticed that $i_1$ is smaller than $j_1$, and the values of $i_1$ and $j_1$ vary with different input process parameter categories. Similarly, the output range from $i_2$ to $j_2$ of each category, such as Depth, Thickness, Defect Count etc., of the process performance data set is also quantized into five subsets as same as the five subsets of one category of the given process parameters. It should be understood that quantization by five subsets is merely exemplary, which is not limited to the invention. For simplicity, the values of the process parameters and the process performance data for all categories can be, for example but not limited to, normalized respectively to possess the same lower scale $i_n$ and upper scale $j_n$, wherein the values of the process parameter (e.g. $x_1$, $x_2$, $x_3$, $x_4$ etc.) and the process performance data (e.g. $y_1$, $y_2$, $y_3$, $y_4$ etc.) located at Target are defined as zero. Therefore, the value (e.g. $x_1, x_2, x_3, x_4 \ldots y_1, y_2, y_3, y_4 \ldots$ etc.) larger than Target is expressed by positive value. That is, the values ranging from zero to $j_{n-1}$ labeled as UCL and from $j_{n-1}$ to $j_n$ labeled as USL, respectively, are positive. On the contrary, the value (e.g. $x_1, x_2, x_3, x_4 \ldots y_1, y_2, y_3, y_4 \ldots$ etc.) smaller than Target is expressed by negative value. That is, the values ranging from zero to in $i_{n+1}$ labeled as LCL and from $i_{n+1}$ to $i_n$ labeled as LCL, respectively, are negative.

Referring back to FIG. 1, in the step S153, a portion of the historic process parameter sets are retrieved from the knowledge database according to the received tool information and the received process information. Then, in the step S155, the received sets of real-time process parameters are approximately matched with the retrieved sets of the historic process parameters to trace a candidate set of the historic process performance data corresponding to the matched sets of the historic process parameters.

Thereafter, the received real-time process parameter sets and the candidate set of the historic process performance data are input into a fuzzification-inference means 104. In the step S157, each of the received real-time process parameters is fuzzified to correspondingly generate a process parameter fuzzy value ($\mu_A(x)$) by using the corresponding sets of the process parameter membership functions (106a, 106b etc.) retrieved from the membership function data bank 102c with respect to the received process information.

Then, in the step S159, by applying a set of fuzzy rules corresponding to the first process to the set of the process parameter fuzzy values with the candidate set of the historic process performance data (e.g. $y_1$, $y_2$, $y_3$, $y_4$ etc.) and the corresponding sets of the process performance membership functions (108a, 108b etc.), a plurality of sets of metrology fuzzy sets (e.g. $(y_1, \mu_B(y_1))$, $(y_2, \mu_B(y_2))$, $(y_3, \mu_B(y_3))$ etc.) is correspondingly generated.

In the step 161, in a defuzzification means (not shown), the sets of metrology fuzzy sets are defuzzified to generate an alarm index. Theoretically, the fuzzy sets can be defuzzified by applying Maximum Defuzzification technique, Centroid Defuzzification technique or Weighted Average Defuzzification technique. More specifically, Maximum Defuzzification technique can be defined by following algebraic expression:

$$\mu_B(y^*) \geq \mu_B(y) \text{ for all } y \in Y,$$

where y* is the defuzzified value. Centroid Defuzzification technique can be expressed as following:

$$y^* = \frac{\int \mu_k(y) y \, dy}{\int \mu_k(y) \, dy},$$

where y* is the defuzzified value, and $\mu_k(y)$ is the aggregated membership function. Weighted Average Defuzzification technique can be expressed as following:

$$y^* = \frac{\sum_{k=1}^{n} m^k w_k}{\sum_{k=1}^{n} m^k},$$

where y* is the defuzzified value, $m^k$ is the membership of the output of each rule and $w_k$ is the weight associated with each rule. Since the results of applying the fuzzification and the fuzzy rules on the received process parameter sets with the candidate set of the process performance data are the metrology fuzzy sets, the metrology fuzzy sets need to be converted into a scalar output quantity for the diagnostic system to determine which nature of the action is going to be performed. Therefore, the metrology fuzzy sets are converted into the alarm index by defuzzifying.

Hence, in the step S163, a decision for determining whether the alarm index falls into the process spec is made. Further, in the step S165, when the alarm index does not fall into the process specification of the first process, the diagnostic system 100 triggers an alarm to inform that the received sets of the real-time process parameters detected by the tool sensors of the first tool during the first process performed by the first tool is abnormally shifting away, and the process performance under this circumstance may not meet the standards. More specifically, for the normalized value of the elements y of the process performance data, when absolute value of the defuzzifying result/ the alarm index is equal to zero, the process performance under the process environment composed of input process parameter sets is predicted to be meeting the target of the process. Furthermore, when the absolute value of the alarm index is over the process specification as defined in S163, such as a positive value as large as USL or a negative value as small as LSL, the process performance under the process environment composed of input process parameter sets is predicted to be not good.

In the present invention, by using the method and the diagnostic system, the real-time process parameters collected during the process is performed by the tool become meaningful and are correlated with the historic process performance data obtained by the post process metrology process. By using fuzzy logic with the real-time process parameter sets and the historic process performance data retrieved from the knowledge database, the process performance can be predicted for every process implementation. Moreover, the method and the diagnostic system further provide an alarm index for the process performed on the tool to actually reflect the process environment during the process is performed after correlating the real-time process parameters and the historic process performance data. With referring to the alarm index, the current process performance under the process environment represented by the real-time process parameter sets in the tool can be accurately predicted.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A diagnostic system for a semiconductor process, comprising:
   means for receiving a set of variables including a tool information of a first tool, a process information with respect to a first process performed by the first tool and at least a set of real-time process parameters of the first tool obtained during the first process is performed by the first tool;
   means for storing a knowledge database comprising a plurality of sets of historic process performance data, a plurality of sets of historic process parameters, a plurality of sets of historic process parameter membership functions and a plurality of sets of process performance membership functions;
   means for retrieving a portion of the historic process parameter sets from the knowledge database with reference to the received tool information and the received process information;
   means for approximately matching the received set of real-time process parameters with the retrieved sets of the historic process parameters to trace a candidate set of the historic process performance data corresponding to the matched set of the historic process parameters;
   means for fuzzifying each of the received real-time process parameters by using the corresponding sets of the process parameter membership functions to correspondingly generate a set of process parameter fuzzy values;
   means for applying a set of fuzzy rules corresponding to the first process to the set of process parameter fuzzy values with the candidate set of the historic process performance data and the corresponding sets of the process performance membership functions to generate a plurality of sets of metrology fuzzy sets; and
   means for defuzzifying the sets of metrology fuzzy sets to generate an alarm index.

2. The diagnostic system of claim 1, wherein the real-time process parameter set is detected by a tool sensor of the first tool during the first process is performed by the first tool.

3. The diagnostic system of claim 2, wherein the real-time process parameter set is detected at a predetermined sampling rate by the tool sensor.

4. The diagnostic system of claim 1, wherein each of the real-time process parameter sets includes a plurality of categories comprising gas flow, pressure, power, process time, temperature and exposure dosage.

5. The diagnostic system of claim 1, wherein each of the historic process performance data sets includes a plurality of categories comprising thickness, depth, critical dimension, film quality, defect counts and overlay offset parameters.

6. The diagnostic system of claim 1, wherein a shape of each historic process parameter membership function is a Triangular shape, a Gaussian shape, a Bell shape, a Pi-shaped, Sigmoid curve shape or Trapezoid shape.

7. The diagnostic system of claim 1, wherein a shape of each historic process performance membership function is a Triangular shape, a Gaussian shape, a Bell shape, a Pi-shaped, Sigmoid curve shape or Trapezoid shape.

8. The diagnostic system of claim 1, wherein the fuzzy rules are IF/THEN rules.

9. The diagnostic system of claim 1, further comprising:
   means for determining whether the alarm index falls into a process specification of the first process; and
   means for triggering an alarm when the alarm index does not fall into the process specification.

10. A diagnostic method for a first process performed by a first tool with at least a set of real-time process parameters of the first tool obtained during the first process is performed on a first wafer by the first tool, the diagnostic method comprising:
    providing a set of variables including a tool information of the first tool, a process information with respect to the first process and the set of real-time process parameters to a diagnostic system having a knowledge database, wherein the knowledge database comprises a plurality of sets of historic process performance data, a plurality of sets of historic process parameters, a plurality of sets of process parameter membership functions and a plurality of sets of process performance membership functions;
    approximately matching the provided set of real-time process parameters with the sets of the historic process parameters in the knowledge database to trace a candidate set of the historic process performance data corresponding to the matched set of the historic process parameters;
    fuzzifying each of the provided real-time process parameters by using the corresponding sets of the process parameter membership functions to correspondingly generate a set of process parameter fuzzy values;
    applying a set of fuzzy rules corresponding to the first process to the set of the process parameter fuzzy values with the candidate set of the historic process performance data and the corresponding sets of the process performance membership functions to generate a plurality of sets of metrology fuzzy sets; and
    defuzzifying the sets of metrology fuzzy sets to generate an alarm index.

11. The diagnostic method of claim 10, further comprising retrieving a portion of the historic process parameter sets from the knowledge database with reference to the provided tool information and the provided process information prior to the step of approximately matching.

12. The diagnostic method of claim 10, further comprising:
    determining whether the alarm index falls into a process specification of the first process; and
    triggering an alarm when the alarm index does not fall into the process specification of the first process.

13. The diagnostic method of claim 10, wherein the real-time process parameter set is detected by a tool sensor of the first tool during the first process is performed by the first tool.

14. The diagnostic method of claim 10, wherein each of the real-time process parameter sets includes a plurality of categories comprising gas flow, pressure, power, process time, temperature and exposure dosage.

15. The diagnostic method of claim 10, wherein each of the historic process performance data sets includes a plurality of categories comprising thickness, depth, critical dimension, film quality, defect counts and overlay offset parameters.

16. The diagnostic method of claim 10, wherein a shape of each historic process parameter membership function is a Triangular shape, a Gaussian shape, a Bell shape, a Pi-shaped, Sigmoid curve shape or Trapezoid shape.

17. The diagnostic method of claim 10, wherein a shape of each historic process performance membership function is a Triangular shape, a Gaussian shape, a Bell shape, a Pi-shaped, Sigmoid curve shape or Trapezoid shape.

18. The diagnostic method of claim 10, wherein the fuzzy rules are IF/THEN rules.

* * * * *